United States Patent [19]

Röck et al.

[11] Patent Number: 4,840,512
[45] Date of Patent: Jun. 20, 1989

[54] FITTING FOR FASTENING THE RAIL MEMBER OF A DRAWER

[75] Inventors: Erich Röck, Höchst; Helmut Hollenstein, Lustenau, both of Austria

[73] Assignee: Julius Blum Gesellschaft m.b.H., Höchst, Austria

[21] Appl. No.: 134,304

[22] Filed: Dec. 15, 1987

[30] Foreign Application Priority Data
Jan. 8, 1987 [AT] Austria ................................. 20/87

[51] Int. Cl.⁴ ............................................... B25G 3/00
[52] U.S. Cl. ...................................... 403/22; 403/199; 403/262; 312/330 R
[58] Field of Search ............... 403/199, 198, 188, 187, 403/200, 262, 264, 22; 312/330 R

[56] References Cited
U.S. PATENT DOCUMENTS
4,601,523 7/1986 Wenzlick et al. .................... 403/262

FOREIGN PATENT DOCUMENTS
1001846 10/1951 France ................................. 403/262

Primary Examiner—Andrew V. Kundrat
Attorney, Agent, or Firm—Wenderoth, Lind & Ponack

[57] ABSTRACT

A fitting for fastening a rail member of a drawer to a rear wall of the drawer includes a supporting member fastenable to the real wall. The rear end of the rail member is held in the support member by a fastening member which is engageable in the supporting member and is screwable into the rail member. The fastening member is clamped to the supporting member by a clamping screw.

5 Claims, 3 Drawing Sheets

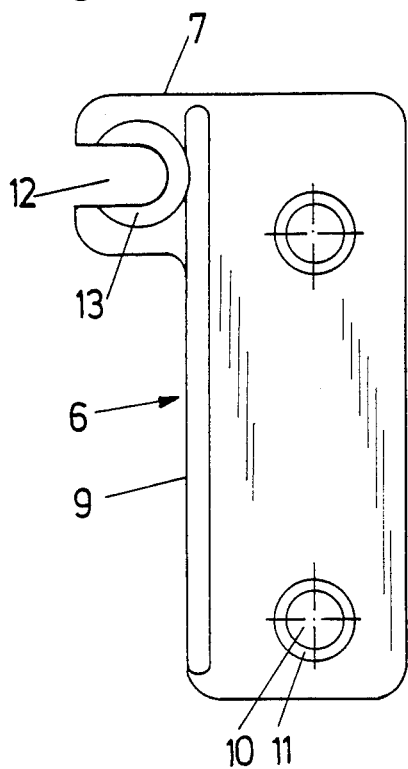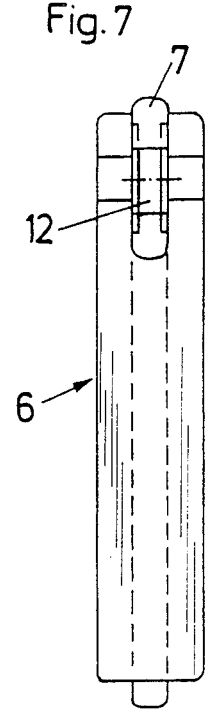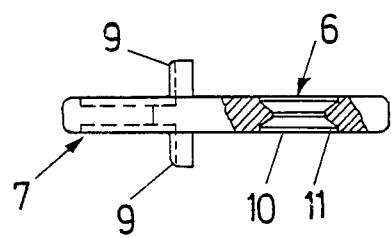

FITTING FOR FASTENING THE RAIL MEMBER OF A DRAWER

FIELD AND BACKGROUND OF THE INVENTION

The present invention relates to a fitting for fastening a rail member of a drawer to a rear wall or side wall of the drawer, the fitting including a supporting member which is fastenable to the rear wall or side wall of the drawer and to which is connected the rear end of the rail member, and a fastening member which is insertable into the rail member and into which a clamping screw is screwed.

In modern furniture construction, known is a drawer wherein the front plate thereof can be adjustably fastened to the drawer side walls by special holding means. In some cases, the drawer includes, above each side wall, a rail member which extends from the front plate to the rear wall of the article of furniture or to a support fastened to the rear wall of the article of furniture.

SUMMARY OF THE INVENTION

It is the object of the invention to improve a fitting for fastening the rail member at an end thereof remote from the front plate. In this arrangement, the rail member can be fastened to the rear wall of the drawer as well as to the rear end of the drawer side wall.

According to the invention this is achieved in that the fastening member, which is preferably screwable into the rail member, is engageable in a supporting member, and that the supporting member is provided with an open slot through which a clamping screw extends.

The fastening member can be quickly engaged with the supporting member and, furthermore, it is possible to obtain a very firm connection by fastening the clamping screw.

It is advantageously provided that the fastening member has a cylindrical non-threaded portion which is snuggly received in the rail member.

The fastening member according to the invention can be screwed into the rail member to different extents to compensate for manufacturing dimensional tolerances. When the front of the rail member is provided with a thread, as described in a prior application by the same Applicant, the rail member can also be used to adjust the inclination of the front plate. The fastening member can be partly screwed out of the rail member, if the latter is screwed too far into the front plate.

An embodiment of the invention provides that the fastening member is provided with a nose or projection that is engageable in a recess of the supporting member.

BRIEF DESCRIPTION OF THE DRAWINGS

In the following an embodiment of the invention will be described in more detail with reference to the accompanying drawings, in which:

FIG. 6 is a front elevation of a supporting member, FIG. 7 is a side view of the supporting member, and FIG. 8 is a top view of the supporting member, parts thereof being shown in section.

DESCRIPTION OF THE PREFERRED EMBODIMENT

Figure 1:
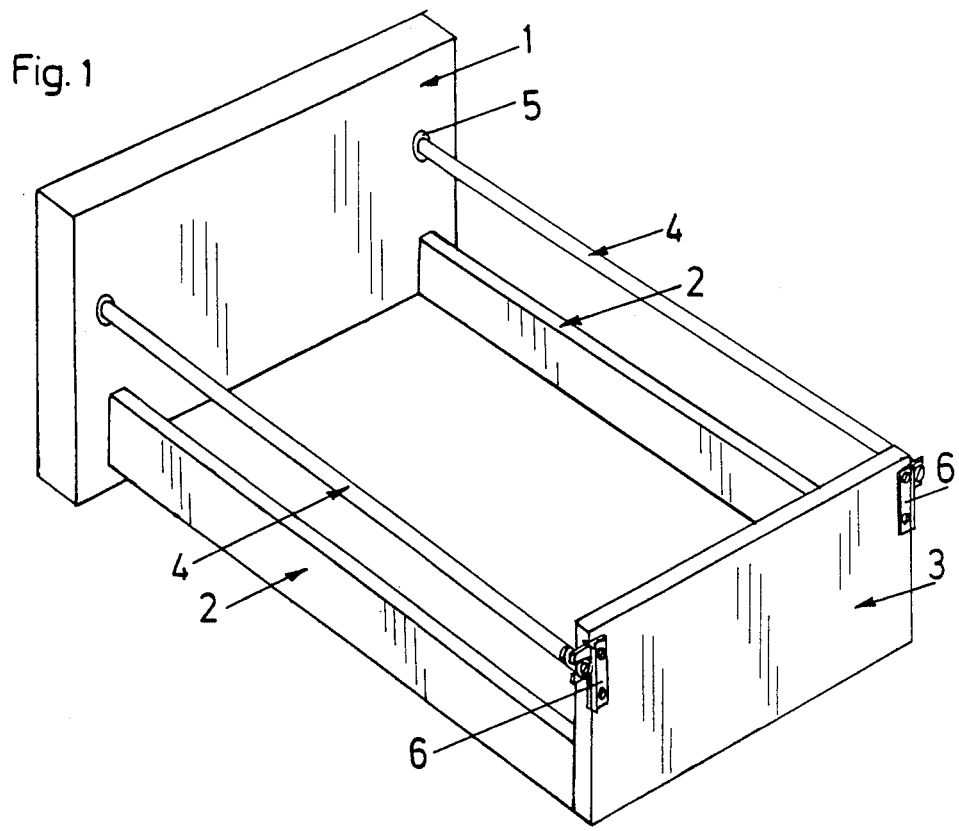
FIG. 1 is a perspective view of a drawer having fittings according to the invention.
Figure 2:
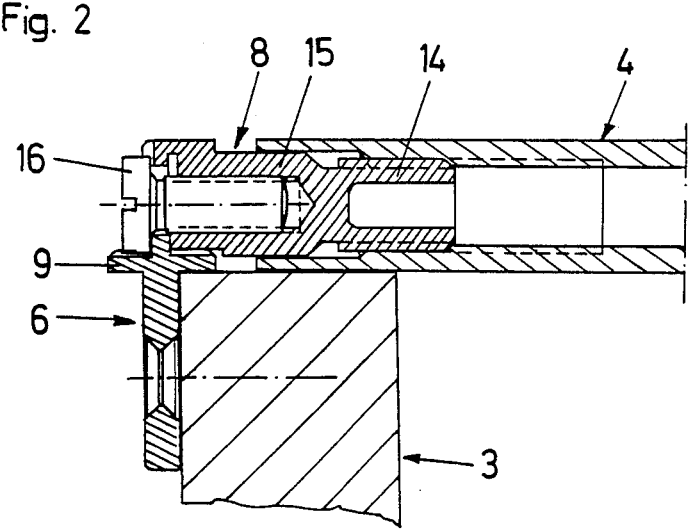
FIG. 2 is a horizontal sectional view of a connection between a rear wall and a rail member with the fitting according to the invention.
Figure 3:
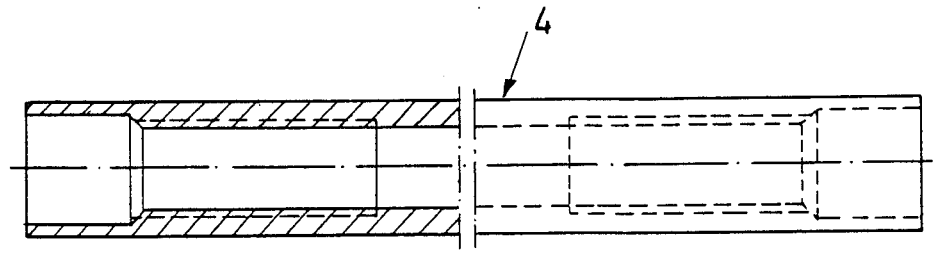
FIG. 3 is the side view of a rail member, parts thereof being shown in section.
Figure 4:
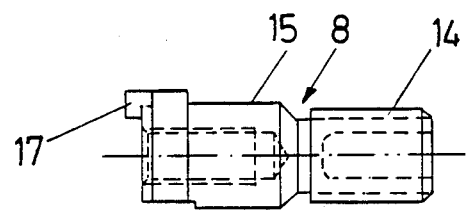
FIG. 4 is a side view of a fastening member.
Figure 5:
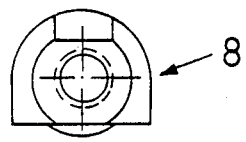
FIG. 5 is a front view of the fastening member.

As can be seen from FIG. 1 of the drawings, a drawer includes a front plate 1, a rear wall 3 and drawer side walls 2. On each side of the drawer, a rail member 4 is provided above the drawer side wall.

Each rail member 4 is fastened to the front plate 1 by means of a fitting 5. A plate-shaped supporting member 6 is screwed to each side of the rear wall 3 of the drawer.

The plate-shaped supporting member 6 has a laterally projecting anchoring member 7 to which the rail member 4 is mounted by means of a fastening member 8.

The supporting member 6 is also provided with two flanges 9, one of which abuts the side surface of the rear wall so that the supporting member 6 is precisely positioned.

As can be seen from FIGS. 2 and 6 to 8, the supporting member 6 is symmetrical and can hence be fastened to the right as well as to the left side of the rear wall 3.

Holes 10 are provided in the supporting member 6 for fastening thereof to rear wall 3, holes 10 being counter sunk at both sides, as indicated by reference number 11.

In the anchoring member 7 there are provided an open slot 12 and a recess 13 for the fastening member 8.

The fastening member 8 has a threaded portion 14 and a cylindrical non-threaded portion 15 which is snuggly received in the rail member 4.

By means of the threaded portion 14 the fastening member 8 is screwable into the rail member 4 to different extents so that differences in the distance between the front plate 1 and the rear wall 3 can be compensated.

A clamping screw 16 is screwed into the fastening member 8. The clamping screw 16 projects through slot 12 of the supporting member 6, when the rail member 4 is in the engaged position, and the supporting member 6 is clamped to the fastening member 8 by means of clamping screw 16.

The fastening 8 is provided with a nose or projection 17 which is advantageously received in a corresponding recess of the supporting member 6, thereby, when screw 6 is turned.

The supporting member 6 and the fastening member 8 may be made of plastics material as well as of diecast metal.

What is claimed is:

1. A fitting for fastening a rail member of a drawer to a rear wall or a side wall of the drawer, said fitting comprising:
   a supporting member to be fastened to the rear wall or side wall of the drawer, said supporting member having therein an open-ended slot;
   a fastening member having means for threadably, rotatably connecting said fastening member to a rear end of the rail member for adjustment relative thereto;
   a clamping screw extending through said slot in said supporting member and threaded into said fastening member; and
   means on said fastening member for, upon turning of said clamping screw to clamp said supporting member between said clamping screw and said fastening member, preventing turning of said fastening member relative to said supporting member.

2. A fitting as claimed in claim 1, wherein said fastening member includes an externally threaded portion to be threaded into the rail member.

3. A fitting as claimed in claim 1, wherein said fastening member includes a cylindrical non-threaded portion to be snuggly received in the rail member.

4. A fitting as claimed in claim 1, wherein said turning preventing means comprises a projection extending from said fastening member and abutting said supporting member.

5. A fitting as claimed in claim 4, wherein said projection fits in a recess in said supporting member.

* * * * *